(12) United States Patent
Albl et al.

(10) Patent No.: US 11,766,916 B2
(45) Date of Patent: Sep. 26, 2023

(54) DEVICE FOR MOUNTING AN AIR-CONDITIONING COMPRESSOR

(71) Applicant: AUDI AG, Ingolstadt (DE)

(72) Inventors: Sebastian Albl, Ingolstadt (DE); Manuel Schreiner, Neuschönau (DE); Marek Bujak, Wellheim (DE)

(73) Assignee: AUDI AG, Ingolstadt (DE)

( * ) Notice: Subject to any disclaimer, the term of this patent is extended or adjusted under 35 U.S.C. 154(b) by 193 days.

(21) Appl. No.: 16/772,619

(22) PCT Filed: Nov. 6, 2018

(86) PCT No.: PCT/EP2018/080365
§ 371 (c)(1),
(2) Date: Jun. 12, 2020

(87) PCT Pub. No.: WO2019/120732
PCT Pub. Date: Jun. 27, 2019

(65) Prior Publication Data
US 2021/0078379 A1   Mar. 18, 2021

(30) Foreign Application Priority Data
Dec. 20, 2017   (DE) ...................... 10 2017 223 425.3

(51) Int. Cl.
*B60K 11/04* (2006.01)
*B60H 1/00* (2006.01)
*B60K 1/00* (2006.01)
*B60H 1/32* (2006.01)

(52) U.S. Cl.
CPC ....... *B60H 1/00521* (2013.01); *B60H 1/3223* (2013.01); *B60K 1/00* (2013.01)

(58) Field of Classification Search
CPC ..... B60H 1/00521; B60H 1/3223; B60K 1/00
USPC ........................................................ 180/68.4
See application file for complete search history.

(56) References Cited

U.S. PATENT DOCUMENTS

| | | |
|---|---|---|
| 2006/0047398 A1 | 3/2006 | Abe et al. |
| 2009/0224446 A1 | 9/2009 | Ishiguro et al. |
| 2012/0031689 A1 | 2/2012 | Kanno |

FOREIGN PATENT DOCUMENTS

| | | | |
|---|---|---|---|
| CN | 201650652 | * | 11/2010 |
| CN | 102431429 A | | 5/2012 |
| CN | 205714652 U | | 11/2016 |
| DE | 1813877 U | | 6/1960 |

(Continued)

OTHER PUBLICATIONS

English-language translation of International Preliminary Report on Patentability dated Jun. 23, 2020, in corresponding International Application No. PCT/EP2018/080365; 7 pages.

(Continued)

*Primary Examiner* — Davis D Hwu
(74) *Attorney, Agent, or Firm* — Maier & Maier, PLLC

(57) ABSTRACT

A device for mounting an air-conditioner compressor on a vehicle body of a motor vehicle, having a retaining unit, which is mounted by at least two bearing elements on the vehicle body and to which the air-conditioner is attached. The retaining unit is arranged on a driven axle of the motor vehicle. In addition to the air-conditioner compressor, a drive assembly of the motor vehicle is attached to the retaining unit. The drive assembly is mounted by at least two further bearing elements on the vehicle body.

14 Claims, 3 Drawing Sheets

(56) References Cited

FOREIGN PATENT DOCUMENTS

| | | |
|---|---|---|
| DE | 102005023830 A1 | 11/2006 |
| DE | 102007044411 A1 | 7/2008 |
| DE | 102007026030 A1 | 12/2008 |
| DE | 102009043392 A1 | 4/2010 |
| DE | 102009015414 A1 | 9/2010 |
| DE | 1020099015414 A1 * | 9/2010 |
| DE | 102011102265 A1 | 4/2012 |
| DE | 102011016624 A1 | 10/2012 |
| DE | 102011101778 A1 | 11/2012 |
| DE | 102013106085 A1 | 12/2014 |
| DE | 102014007693 A1 | 11/2015 |
| JP | H0752638 A | 2/1995 |
| JP | H07186695 A | 7/1995 |
| JP | H08310252 A | 11/1996 |
| JP | H10147152 A | 6/1998 |
| JP | 2005129245 A | 5/2005 |
| JP | 2006188085 A | 7/2006 |
| JP | 2014008793 A | 1/2014 |
| JP | 2016022799 A | 2/2016 |
| RU | 2112150 C1 | 5/1998 |
| WO | WO97/49938 * | 6/1997 |
| WO | 2006070558 A1 | 7/2006 |

OTHER PUBLICATIONS

European Examination Report dated Jan. 18, 2022, in connection with corresponding European Application No. 18800574.8 (16 pp., including machine-generated English translation).

German Office Action dated Oct. 8, 2018 in corresponding application No. 10 2017 223 425.3; 20 pages.

German Office Action dated Nov. 22, 2018 in corresponding application No. 10 2017 223 425.3; 20 pages.

International Search Report and Written Opinion dated Feb. 21, 2019 in corresponding application No. PCT/EP2018/080365; 16 pages.

German Examination Report, dated Jul. 20, 2022, in corresponding German Patent Application No. 102017223425.3: 21 pages.

Office Action dated Dec. 21, 2022, in corresponding Chinese Application No. 201880081334.2, 19 pages.

Office Action dated Jun. 6, 2023, in corresponding Chinese Application No. 201880081334.2, 18 pages.

* cited by examiner

DEVICE FOR MOUNTING AN AIR-CONDITIONING COMPRESSOR

FIELD

The invention relates to a device for mounting an air-conditioner compressor on a vehicle body of a motor vehicle. Furthermore, the invention relates to a motor vehicle having a vehicle body and having at least two axles.

BACKGROUND

A device of the type in question is known from DE 10 2009 015 414 A1. An electric motor and a transmission interacting with it are to be able to be installed as compactly as possible and in a simple manner in the vehicle using this device.

Electrical air-conditioner compressors are typically fastened, for example, on an electric motor, wherein an acoustic vibration decoupling is provided for this purpose between the air-conditioner compressor and the electric motor. The electric motor is then fastened on the vehicle body of the motor vehicle.

In particular if the electric motor is connected by means of a four-point mount to the vehicle body, the assembly bearings and/or supports occupy a large amount of installation space, whereby housing the electrical air-conditioner compressor is made more difficult. This frequently has the result that the assembly supports have to be strongly trimmed. The unfavorable installation space of the assembly supports additionally requires the use of a large amount of weight, to be able to constitute the required rigidity of the supports at all.

A further significant disadvantage of the known approaches is that in the case of vehicles having only one driven axle within a type range in which vehicles having two driven axles also exist, an air-conditioner compressor installed on the nondriven axle has to be connected in an alternative manner to the motor vehicle.

SUMMARY

It is therefore the object of the present invention to provide a device for mounting an air-conditioner compressor on a vehicle body of a motor vehicle, which can be universally used in greatly varying embodiments of motor vehicles.

A significant enhancement of the rigidity of the attachment of the air-conditioner compressor and the bearing elements used for mounting the air-conditioner compressor and in particular the drive assembly results due to the mounting of the drive assembly means of at least two further bearing elements on the vehicle body.

The solution according to the invention additionally contributes to the weight and cost reduction, which finally enables the saving of fuel or energy used for the drive of the motor vehicle in general. The device according to the invention also represents a particularly advantageous solution with respect to the required installation space.

If, in one advantageous design of the invention, decoupling elements are arranged between the drive assembly and the bearing elements, a particularly good mounting of the drive assembly thus results.

Due to the arrangement of the retaining unit on a non-driven axle of the motor vehicle and solely the attachment of the air-conditioner compressor to the retaining unit, a device to be embodied very simply results, which leads to a reduction of the mass of the motor vehicle. The approach according to the invention additionally enables the air-conditioner compressor to always be attached to the same axle in a vehicle of the same type range, independently of whether or not the axle is driven.

To enhance the rigidity of the entire device and in particular the mounting of the air-conditioner compressor and optionally the drive assembly, it can furthermore be provided that the retaining unit is mounted on the vehicle body on both sides thereof.

In a simplified embodiment, however, it is also possible that the retaining unit is only mounted on one side of the vehicle body.

The device according to the invention may be used particularly advantageously if the drive assembly is an electric motor.

A motor vehicle having a vehicle body, having at least two axles, and having a device according to the invention for mounting an air-conditioner compressor on the vehicle body is specified in the disclosure.

The device according to the invention can be used particularly advantageously in this case if only one axle of the motor vehicle is driven.

An advantageous use of the device according to the invention is possible in particular if only the rear axle of the motor vehicle is driven, since in this case the air-conditioner compressor can also still be installed on the front axle due to the approach according to the invention.

However, it is also possible to use the device according to the invention if at least two axles of the motor vehicle are driven.

Exemplary embodiments of the invention are described in principle hereinafter on the basis of the drawing.

DETAILED DESCRIPTION

Figure 1:
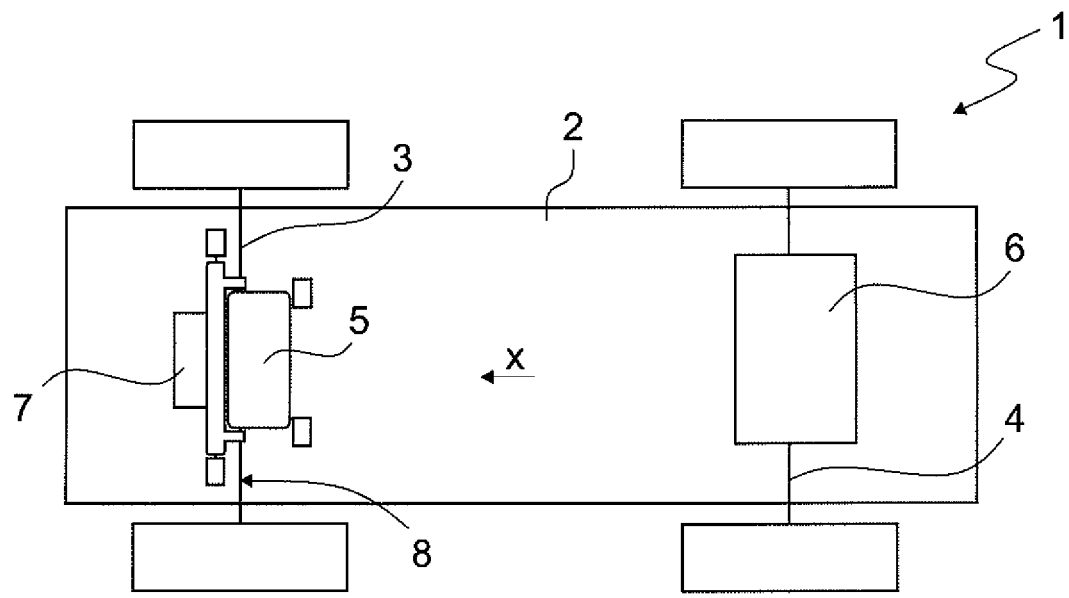
FIG. 1 shows a first embodiment of a motor vehicle according to the invention.

FIG. 1 shows a first embodiment of a motor vehicle 1, which comprises a vehicle body 2 and two axles 3 and 4, namely a front axle 3 and a rear axle 4. The travel direction "x" of the motor vehicle 1 is indicated in all figures by means of a correspondingly identified arrow. In the exemplary embodiment illustrated in FIG. 1, both axles 3 and 4 are driven, i.e., it is a four-wheel-drive motor vehicle 1. In this case, a first drive assembly 5 is provided for driving the front axle 3 and a second drive assembly 6 is provided for driving the rear axle 4. In the present case, both drive assemblies 5 and 6 are electric motors in each case. Furthermore, an air-conditioner compressor 7 is mounted in the motor vehicle 1, specifically by means of a device 8 described in detail hereinafter, which is thus used for mounting the air-conditioner compressor 7 on the vehicle body 2 of the motor vehicle 1. The device 8 is associated with the front axle 3 in this case.

Figure 2:
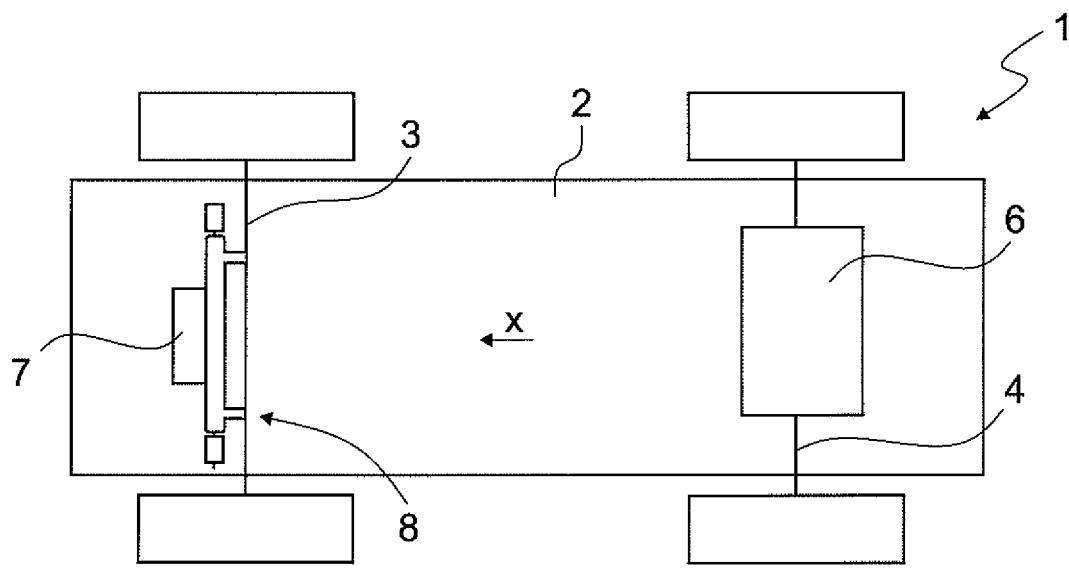
FIG. 2 shows a second embodiment of the motor vehicle according to the invention.

A further embodiment of the motor vehicle 1 is described in FIG. 2. Like the motor vehicle 1 from FIG. 1, it comprises the vehicle body 2, the front axle 3, and the rear axle 4. In this case, however, only the rear axle 4 is driven by means of the second drive assembly 6, while in contrast the first drive assembly 5 used on the front axle 3 in FIG. 1 is not present. Nonetheless, the air-conditioner compressor 7 is mounted by means of the device 8, which is also present here, on the vehicle body 2, wherein the retaining unit 9 is arranged on the nondriven front axle 3 and only the air-conditioner compressor 7 is attached to the retaining unit 9. For this purpose, the device 8 can be embodied identically in principle to the device 8 according to FIG. 1. Since the first drive assembly 5 is not present in the embodiment of FIG. 2, specific interfaces, which are not described in greater detail with reference to FIG. 2, can be omitted between the device 8 and the first drive assembly 5.

By way of the device 8 it is thus possible to always attach the air-conditioner compressor 7 to the same axle 3 or 4, respectively, in a vehicle of the same type range, independently of whether or not the axle 3 or 4 is driven. The device 8 is associated with the front axle 3 in each of the illustrated exemplary embodiments. However, it would also be possible to associate the device 8 with the rear axle 3 in each case. This applies in particular, but not exclusively, if only the front axle 3 of the motor vehicle 1 is driven.

Various embodiments of the device 8 are illustrated very schematically in FIGS. 3 to 6. The first drive assembly 5 is present on the front axle 3 in each case here. However, it is possible without problems in each individual one of the embodiments described hereafter of the device 8 to omit the attachment of the first drive assembly 5 to the device 8, as is apparent in a similar manner from a comparison of FIGS. 1 and 2.

Figure 3:
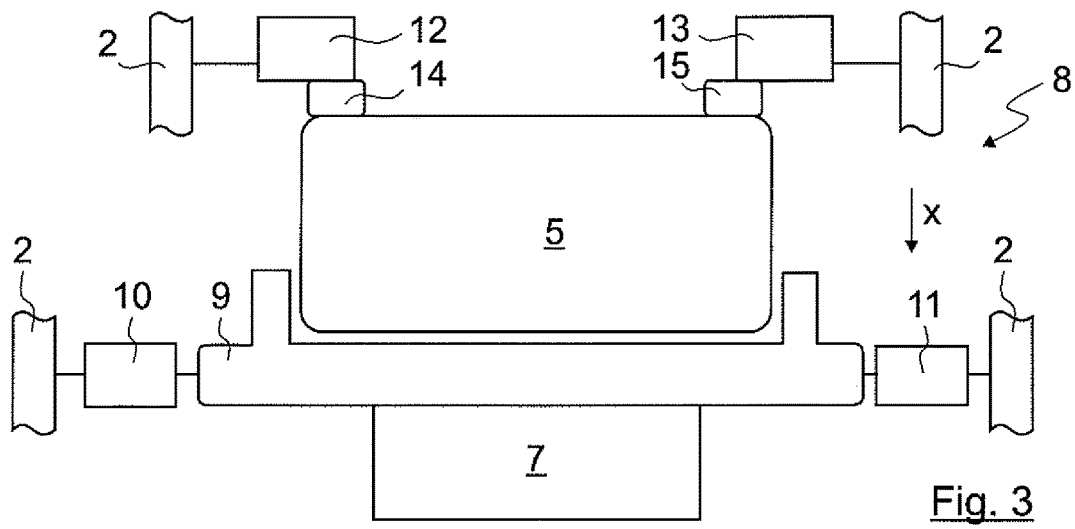
FIG. 3 shows a first embodiment of the device according to the invention.

FIG. 3 shows the embodiment already illustrated in FIG. 1 of the device 8 for mounting the air-conditioner compressor 7 on the vehicle body 2 of the motor vehicle 1. The device 8 comprises a retaining unit 9, which is mounted by means of two bearing elements 10 and 11 on the vehicle body 2, which is solely indicated in FIG. 3, of the motor vehicle 1. The connection between the bearing elements 10 and 11 and the vehicle body 2 is solely indicated here. In the embodiment of FIG. 3, the retaining unit 9 is mounted on the vehicle body 2 on both sides thereof. The air-conditioner compressor 7 is attached to the retaining unit 9. Furthermore, the first drive assembly 5, which is used to drive the front axle 3 of the motor vehicle 1, is attached to the retaining unit 9. On the side opposite to the retaining unit 9, the first drive assembly is mounted by means of two further bearing elements 12 and 13 on the vehicle body 2. The connection between the bearing elements 10 and 11 and the vehicle body 2 is also solely indicated here. To achieve a vibration decoupling of the first drive assembly 5 from the vehicle body 2, respective decoupling elements 14 and 15, which can also be referred to as motor supports, are provided between the first drive assembly 5 and the two bearing elements 12 and 13.

Figure 4:
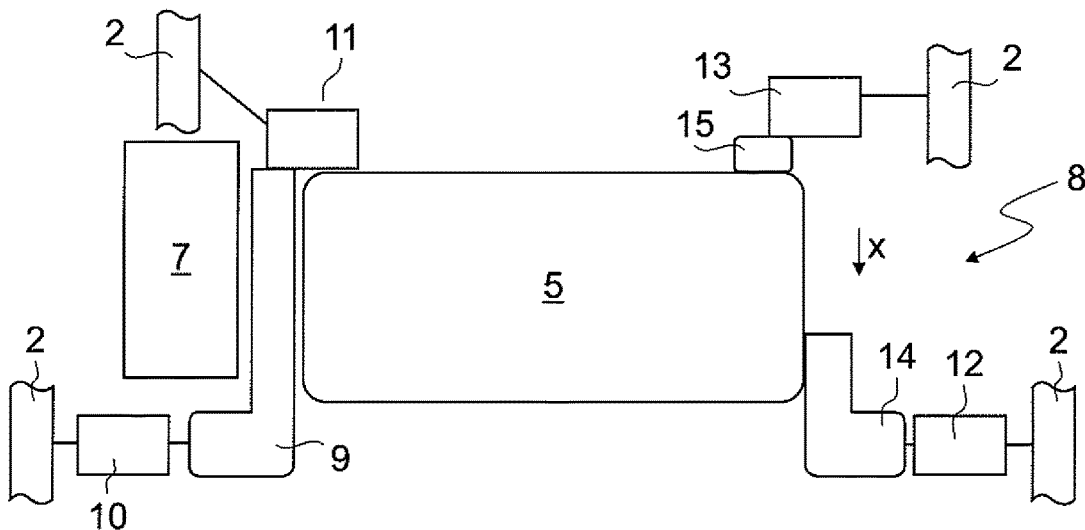
FIG. 4 shows a second embodiment of the device according to the invention.

An alternative embodiment of the device 8 is illustrated in FIG. 4. In this case, the retaining unit 9 is only mounted on one side of the vehicle body 2, specifically again by means of the two bearing elements 10 and 11. The first drive assembly 5, in contrast, is mounted on the other side of the vehicle body 2, for which the two bearing elements 12 and 13 are again used. As in the embodiment of FIG. 3, the two decoupling elements 14 and 15 are also provided here between the first drive assembly 5 and the bearing elements 12 and 13. The air-conditioner compressor 7 is again provided on one side and the first drive assembly 5 is provided on the other side on the retaining unit 9.

Since the bearing elements 10 and 11 and also the bearing elements 12 and 13 and the decoupling elements 14 and 15 connected thereto assume the same function in principle in every embodiment described herein and are solely installed at other positions, they could each also be provided with the other, corresponding reference sign.

Figure 5:
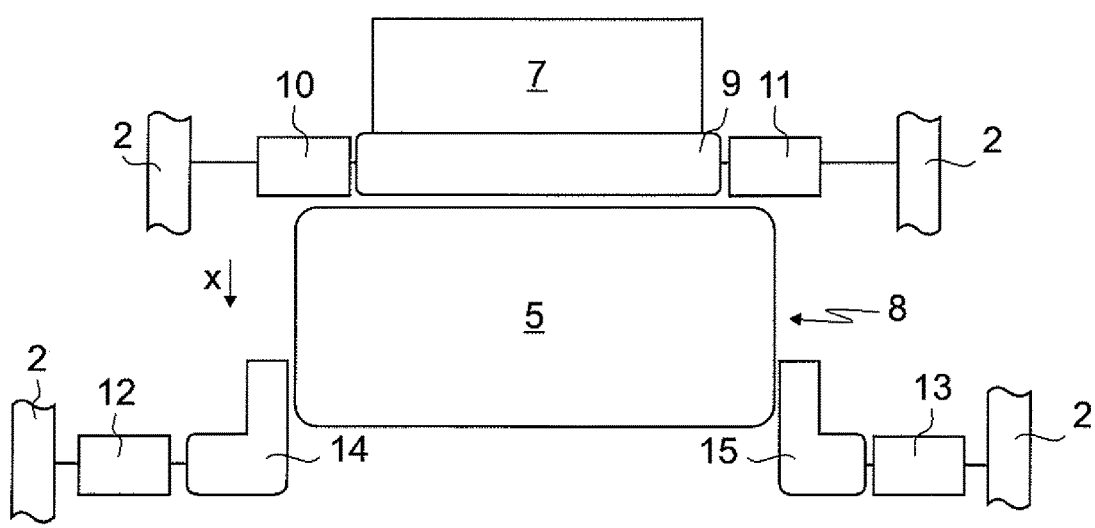
FIG. 5 shows a third embodiment of the device according to the invention.

In the embodiment of the device 8 according to FIG. 5, the sides on which the first drive assembly 5 or the air-conditioner compressor 7, respectively, are attached on the retaining unit 9 are exchanged in relation to the embodiment of FIG. 3. This can be advantageous, for example, for reasons of the existing installation space. Otherwise, the retaining unit 9 is also mounted here by means of the bearing elements 10 and 11 on both sides of the vehicle body 2. The first drive assembly 5 and the air-conditioner compressor 7 are attached to the retaining unit 5, as mentioned. The first drive assembly 5 is mounted by means of the bearing elements 12 and 13 on the vehicle body 2, wherein the decoupling elements 14 and 15 are also provided here.

Figure 6:
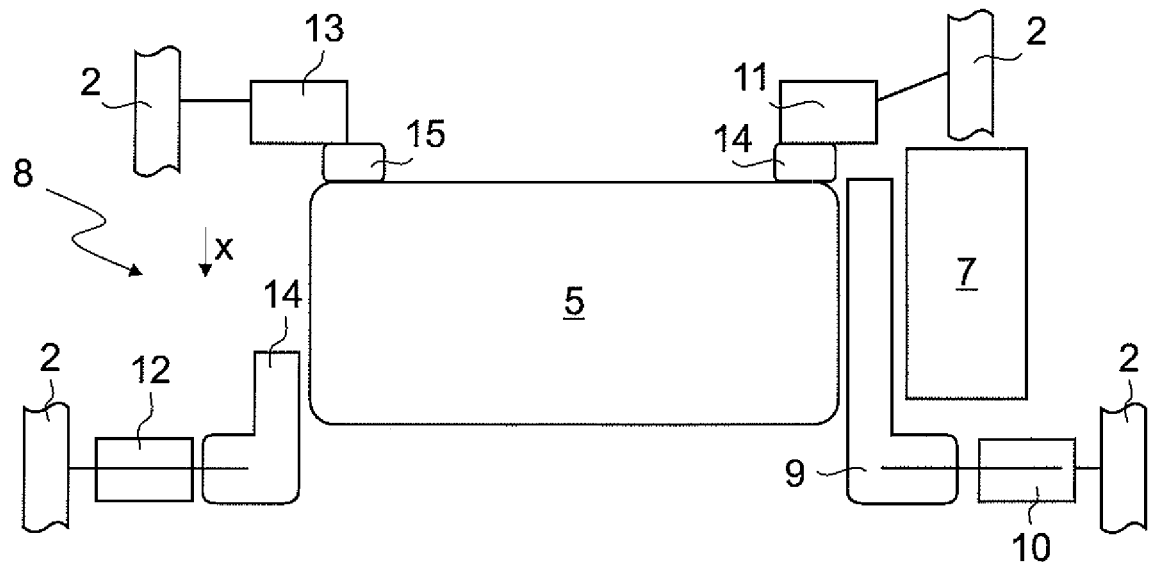
FIG. 6 shows a fourth embodiment of the device according to the invention.

The embodiment illustrated in FIG. 6 is in mirror-image in principle to that of FIG. 4, i.e., the retaining unit 9 is only mounted on one side of the vehicle body 2 and the first drive assembly 5 is mounted on the other side of the vehicle body 2.

Figure 7:
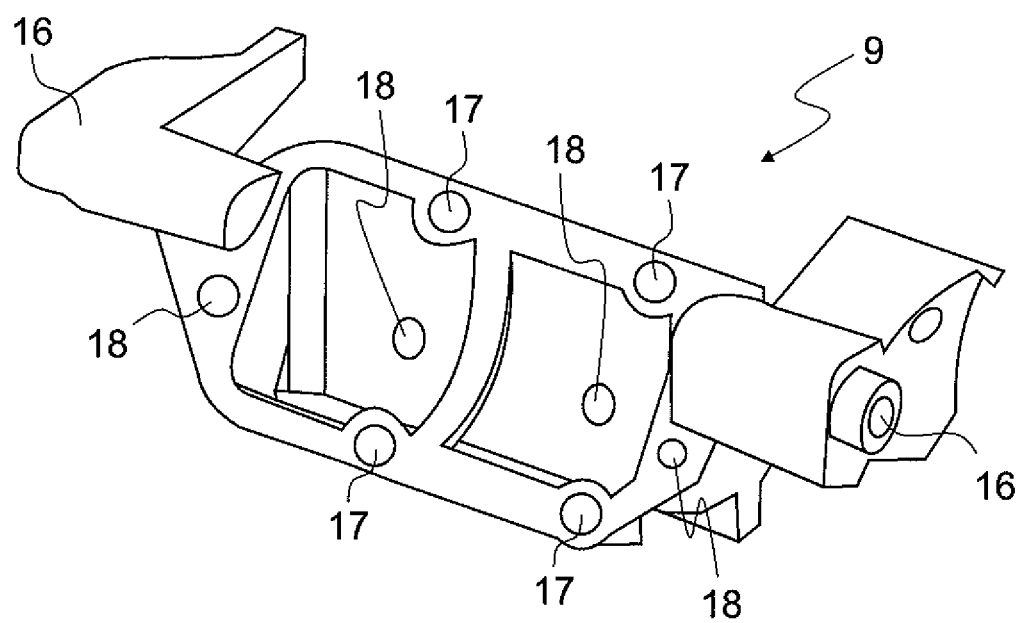
FIG. 7 shows a detailed illustration of the retaining unit of the device according to the invention.

The retaining unit 9 is illustrated in greater detail in FIG. 7 and attachment points 16 thereof to the bearing elements 10 and 11 can be seen. Accordingly, the bearing elements 10 and 11 and thus the retaining unit 9 can be attached to the vehicle body 2 at these attachment points 16, which are preferably designed as elastic bearings. Furthermore, attachment points 17 for attaching the air-conditioner compressor 7 to the retaining unit 9 are shown. The attachment points 17 can be, for example, rubber elements having screw sleeves, whereby slight movements of the air-conditioner compressor are enabled. The decoupling resulting in this manner leads to acoustic advantages, since fewer interfering frequencies occur. Together with the attachment points 16, a double acoustic decoupling of the air-conditioner compressor 7 thus results. Finally, FIG. 7 also shows multiple attachment points 18 for attaching the first drive assembly 5 to the retaining unit 9. The retaining unit 9 is preferably rigidly attached to the drive assembly 5, which enhances the rigidity of the entire system or the entire device 8.

The invention claimed is:

1. A motor vehicle, comprising:
a vehicle body, having at least two axles and having a device for mounting an air-conditioner compressor on the vehicle body,
wherein the device for mounting an air conditioner compressor includes a retaining unit, which is mounted by at least two bearing elements on the vehicle body and to which the air-conditioner compressor is attached,
wherein the retaining unit is arranged on a driven axle of the motor vehicle, and in addition to the air-conditioner compressor, a drive assembly of the motor vehicle is attached to the retaining unit, and the drive assembly is mounted by at least two further bearing elements on the vehicle body.

2. The motor vehicle as claimed in claim 1, wherein only one axle of the motor vehicle is driven.

3. The motor vehicle as claimed in claim 2, wherein only the rear axle of the motor vehicle is driven.

4. The motor vehicle as claimed in claim 1, wherein at least two axles of the motor vehicle are driven.

5. The motor vehicle as claimed in claim 1, wherein the retaining unit is mounted on the vehicle body on both sides thereof.

6. A device for mounting an air-conditioner compressor to a vehicle body of a motor vehicle, comprising:
a retaining unit,
wherein the retaining unit is mounted by at least two bearing elements to the vehicle body,
wherein the air-conditioner compressor is attached to the retaining unit,
wherein a first of a front and a rear axle of the motor vehicle is a driven axle and the retaining unit is arranged on the driven axle, and
wherein a drive assembly for driving the driven axle is attached to the retaining unit and the drive assembly is mounted to the vehicle body by at least two further bearing elements.

7. The device as claimed in claim 6, wherein decoupling elements, which vibrationally decouple the drive assembly from the vehicle body, are arranged between the drive assembly and the at least two further bearing elements.

8. The device as claimed in claim 6, wherein both the front and the rear axle of the motor vehicle are driven axles and the retaining unit is arranged on the first of the driven axles.

9. The device as claimed in claim 6, wherein the motor vehicle further comprises:
a second drive assembly for driving a second of the front and the rear axle of the motor vehicle.

10. The device as claimed in claim 9, wherein decoupling elements, which vibrationally decouple the drive assembly from the vehicle body, are arranged between the drive assembly and the at least two further bearing elements.

11. The device as claimed in claim 6, wherein a first of the at least two bearing elements is mounted to a first side of the vehicle body, transverse to a travel direction of the motor vehicle, and a second of the at least two bearing elements is mounted to a second side of the vehicle body opposite the first side.

12. The device as claimed in claim 6, wherein both of the at least two bearing elements are mounted to one side of the vehicle body transverse to a travel direction of the motor vehicle.

13. The device as claimed in claim 6, wherein the drive assembly is an electric motor.

14. A device for mounting an air-conditioner compressor to a vehicle body of a motor vehicle, comprising:
a retaining unit,
wherein the retaining unit is mounted by at least two bearing elements to the vehicle body,
wherein the air-conditioner compressor is attached to the retaining unit,
wherein a first of a front and a rear axle of the motor vehicle is a driven axle, a second of the front and the rear axle of the motor vehicle is a non-driven axle, and the retaining unit is arranged on the non-driven axle.

* * * * *